United States Patent
Ye

(10) Patent No.: US 10,419,888 B2
(45) Date of Patent: Sep. 17, 2019

(54) WIRELESS TRACKING AND POSITIONING SYSTEM AND METHOD THEREOF

(71) Applicant: Chengdu Yueyang Technology Co., Ltd., Chengdu, Sichuan (CN)

(72) Inventor: Song Ye, Sichuan (CN)

(73) Assignee: Chengdu Yueyang Technology Co., Ltd., Chengdu, Sichuan (CN)

(*) Notice: Subject to any disclaimer, the term of this patent is extended or adjusted under 35 U.S.C. 154(b) by 0 days.

(21) Appl. No.: 16/157,487

(22) Filed: Oct. 11, 2018

(65) Prior Publication Data

US 2019/0045332 A1 Feb. 7, 2019

(30) Foreign Application Priority Data

Apr. 10, 2018 (CN) .......................... 2018 1 0313506

(51) Int. Cl.
| | |
|---|---|
| *H04W 24/00* | (2009.01) |
| *H04W 4/029* | (2018.01) |
| *H04L 29/08* | (2006.01) |
| *H04W 12/12* | (2009.01) |
| *H04W 12/00* | (2009.01) |

(52) U.S. Cl.
CPC ............ *H04W 4/029* (2018.02); *H04L 67/10* (2013.01); *H04W 12/0051* (2019.01); *H04W 12/1206* (2019.01)

(58) Field of Classification Search
CPC ...................................................... H04W 4/029
USPC ........................................................ 455/456.1
See application file for complete search history.

(56) References Cited

U.S. PATENT DOCUMENTS

| | | | |
|---|---|---|---|
| 9,939,784 B1* | 4/2018 | Berardinelli | G06F 21/35 |
| 2013/0234853 A1* | 9/2013 | Kazerouni | G08B 13/1427 |
| | | | 340/572.1 |

* cited by examiner

*Primary Examiner* — Amancio Gonzalez

(57) ABSTRACT

A wireless tracking and positioning system includes: a wireless tag, a mobile terminal and a server cloud platform. A wireless tracking and positioning method includes steps of: placing a wireless tag on a tracked object for continuously or intermittently broadcasting ID information; receiving the ID information with a mobile terminal which sends self position information and the ID information of the wireless tag to a server cloud platform; storing information of the tracked object in the server cloud platform; when the tracked object moves, timely updating and storing the position information of the wireless tag, and displaying the position information on the server cloud platform; when a user requires the position information of the tracked object, accessing the server cloud platform through an interface reserved by the server cloud platform, and obtaining the position information and ID information of the tracked object.

8 Claims, 4 Drawing Sheets

WIRELESS TRACKING AND POSITIONING SYSTEM AND METHOD THEREOF

CROSS REFERENCE OF RELATED APPLICATION

The present invention claims priority under 35 U.S.C. 119(a-d) to CN 201810313506.6, filed Apr. 10, 2018.

BACKGROUND OF THE PRESENT INVENTION

Field of Invention

The present invention relates to a technical field of tracking and positioning, and more particularly to a wireless tracking and positioning system and a method thereof.

Description of Related Arts

With the improvement of people's quality of life, material life is increasingly rich, and people have more and more valuables. Conventionally, most of the safety protections for cars and motorcycles are locks, so as to increase their anti-theft function. With the improvement of living standards, many people regard pets such as dogs and cats as members of the family. However, pets are difficult to ensure safety through locks. Frequent incidents of pet loss occur, and in most cases, these pets are difficult to return along the original route. The owner can only ask passerby for help, and cannot obtain the location information in time, which makes it difficult to retrieve the pet. The present invention provides a wireless tracking and positioning system and a method thereof, which facilitates the observer to obtain important information such as position of the tracked object in time.

SUMMARY OF THE PRESENT INVENTION

In view of the above problems, the present invention provides a wireless tracking and positioning system and a method thereof, which is reasonable designed to facilitate an observer to obtain a position of a tracked object in time, and realize real-time tracking and positioning of information such as the position of the tracked object.

Accordingly, in order to accomplish the above objects, the present invention provides:

a wireless tracking and positioning system, comprising: a wireless tag, a mobile terminal and a server cloud platform, for a user to receive position information of a tracked object; wherein the wireless tag is a wireless transmitter, which is placed on the tracked object for continuously or intermittently broadcasting ID (identification) information to be received by the mobile terminal nearby; wherein a first end of the mobile terminal wirelessly detects the wireless tag, and a second end of the mobile terminal is wirelessly connected to the server cloud platform; the mobile terminal receives the ID information of the wireless tag and reads verification information from the ID information; wherein the server cloud platform receives data information from the mobile terminal, and provides an interface for the user to communicate with the server cloud platform, and for the user to access the server cloud platform in real time, so as to track and position the tracked object.

According to the wireless tracking and positioning system, the mobile terminal directly displays the position information of the tracked object, and the position information of the tracked object is provided to the user by the first end mobile terminal; the mobile terminal near the tracked object also serves as a relay station for sending the position information to the server cloud platform for storage and update through a mobile network or a wireless network, and the server cloud platform provides the interface to the user for accessing the server cloud platform; the user access the interface of the server cloud platform to obtain the position information of the tracked object, so as to real-time track and position the position information and the ID information of the tracked object.

According to the wireless tracking and positioning system, the server cloud platform comprises a php (personal home page) file and an HTML (HyperText Markup Language) file; the php file is used to store the ID information and the position information of the tracked object received from the mobile terminal, and to update data in real time; the HTML file provides a real-time browsing information platform to the user.

According to the wireless tracking and positioning system, the mobile terminal near the tracked object is a mobile phone of a passerby, and is not arranged in advance.

According to the wireless tracking and positioning system, the wireless tag communicates with the mobile terminal without password verification of a wireless signal.

According to the wireless tracking and positioning system, the wireless tag is a highly integrated WIFI chip or a Bluetooth chip, or comprises both the WIFI chip and the Bluetooth chip.

The present invention also provides a wireless tracking and positioning method of a wireless tracking and positioning system, comprising steps of: placing a wireless tag on a tracked object, wherein the wireless tag is a wireless transmitter, which is placed on the tracked object for continuously or intermittently broadcasting ID (identification) information; receiving the ID information with a mobile terminal which sends self position information and the ID information of the wireless tag to a server cloud platform; storing information of the tracked object in the server cloud platform; when the tracked object moves, timely updating and storing the position information of the wireless tag, and displaying the position information on the server cloud platform; when a user requires the position information of the tracked object, accessing the server cloud platform through an interface reserved by the server cloud platform in real time, and obtaining the position information and the ID information of the tracked object.

According to the wireless tracking and positioning method, the mobile terminal directly displays the position information of the tracked object, and the position information of the tracked object is provided to the user by the mobile terminal; the mobile terminal near the tracked object also serves as a relay station for sending the position information to the server cloud platform for storage and update through a mobile network or a wireless network, and the server cloud platform provides the interface to the user for accessing the server cloud platform; the user access the interface of the server cloud platform to obtain the position information of the tracked object, so as to real-time track and position the position information and the ID information of the tracked object.

According to the wireless tracking and positioning method, the server cloud platform comprises a php (personal home page) file and an HTML (HyperText Markup Language) file; the php file is used to store the ID information and the position information of the tracked object received from the mobile terminal, and to update data in real time; the HTML file provides a real-time browsing information platform to the user.

According to the wireless tracking and positioning method, the mobile terminal near the tracked object is a mobile phone of a passerby, and is not arranged in advance; wherein the wireless tag communicates with the mobile terminal without password verification of a wireless signal; wherein the wireless tag is a highly integrated WIFI chip or a Bluetooth chip, or comprises both the WIFI chip and the Bluetooth chip.

Beneficial Effects

The wireless tracking and positioning system and method of the present invention is reasonable designed to facilitate an observer to obtain a position of a tracked object in time, and realize real-time tracking and positioning of information such as the position of the tracked object. The present invention places the wireless tag on the tracked object, and uses the mobile terminal for relaying, so as to obtain the ID information of the wireless tag and send it to the server cloud platform to realize real-time tracking and positioning of the tracked object. Compared with conventional tracking and positioning methods based on WIFI hotspot routers, the present invention is more convenient. There is no need to place positioning devices in advance, and power consumption as well as cost are low.

These and other objectives, features, and advantages of the present invention will become apparent from the following detailed description, the accompanying drawings, and the appended claims.

DETAILED DESCRIPTION OF THE PREFERRED EMBODIMENT

Figure 1:
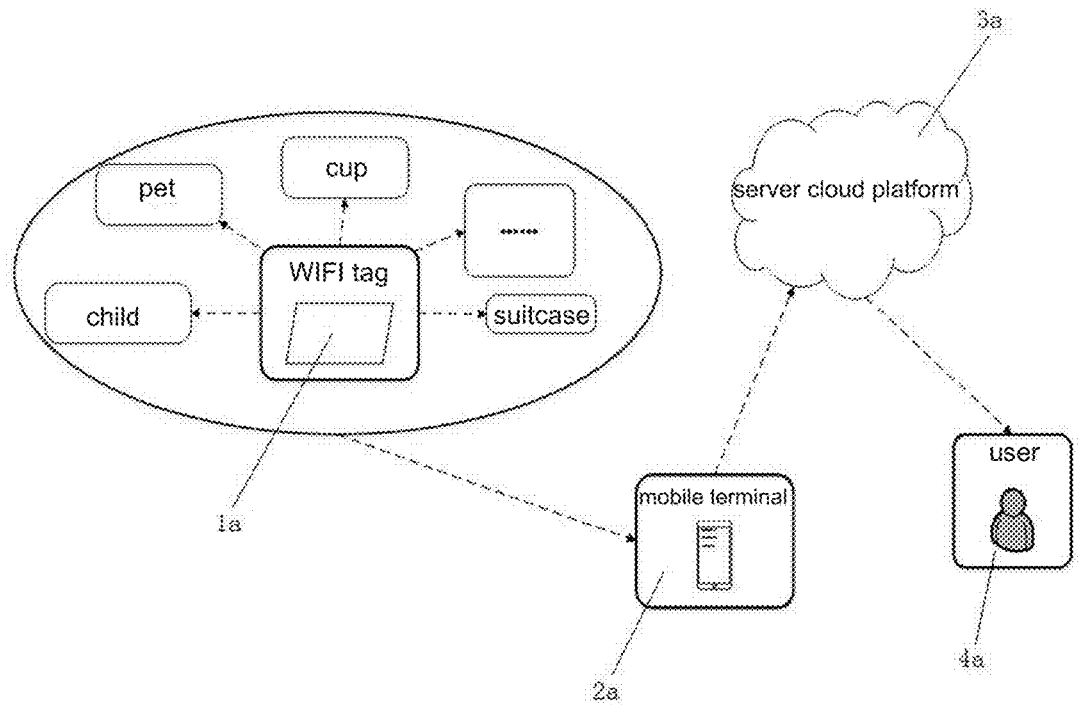
FIG. 1 is a structural view of a wireless tracking and positioning system according to an embodiment 1 of the present invention.

Referring to the drawings, embodiments of the present invention will be further illustrated as follows.

Embodiment 1

Referring to FIGS. 1-4, a wireless tracking and positioning system according to an embodiment 1 of the present invention is provided, comprising: a WIFI tag (a WIFI transmitter) 1a, a mobile terminal 2a and a server cloud platform 3a, for a user 4a to receive position information of a tracked object.

The WIFI tag 1a continuously or intermittently broadcasts SSID information (a radio signal) to be received by the mobile terminal 2a nearby. The WIFI tag 1a can be worn on a pet or fixed on a valuable item and other objects that need to be tracked and positioned. The WIFI tag adopts a highly integrated WIFI chip.

A first end of the mobile terminal 2a wirelessly detects the WIFI tag 1a, and a second end of the mobile terminal 2a is wirelessly connected to the server cloud platform 3a; the mobile terminal 2a receives the SSID information of the WIFI tag 1a and reads important information from the SSID information. The mobile terminal 2a directly displays the position information of the tracked object, and the position information of the tracked object is provided to the user by the mobile terminal 2a through, but not limited to, GPS positioning and cellular base station positioning. The mobile terminal 2a near the tracked object also serves as a relay station for sending the position information to the server cloud platform 3a for storage and update through a mobile network or a WIFI network, and the server cloud platform 3a provides the interface to the user 4a for accessing the server cloud platform 3a. The user 4a access the interface of the server cloud platform 3a to obtain the position information of the tracked object, so as to real-time track and position the position information and the SSID information of the tracked object.

Accordingly, the mobile terminal 2a near the tracked object is a mobile phone of a passerby, and is not arranged in advance. Meanwhile, the WIFI tag 1a real-time communicates with the mobile terminal 2a without password verification of a wireless signal. The WIFI tag 1a continuously or intermittently broadcasts the SSID information, and information of the WIFI tag 1a is easily received by the mobile terminal 2a nearby.

The server cloud platform 3a receives data information from the mobile terminal 2a, and provides an interface for the user 4a to communicate with the server cloud platform 3a, and for the user to access the server cloud platform 3a in real time, so as to track and position valuable items or pets.

Figure 2:
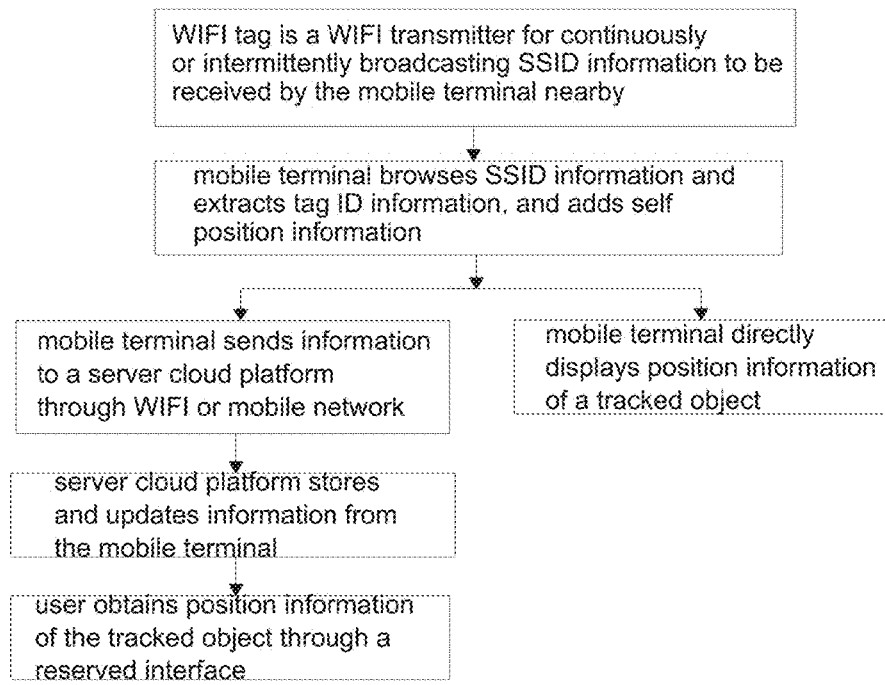
FIG. 2 is a flowchart of a wireless tracking and positioning method according to the embodiment 1 of the present invention.
Figure 3:
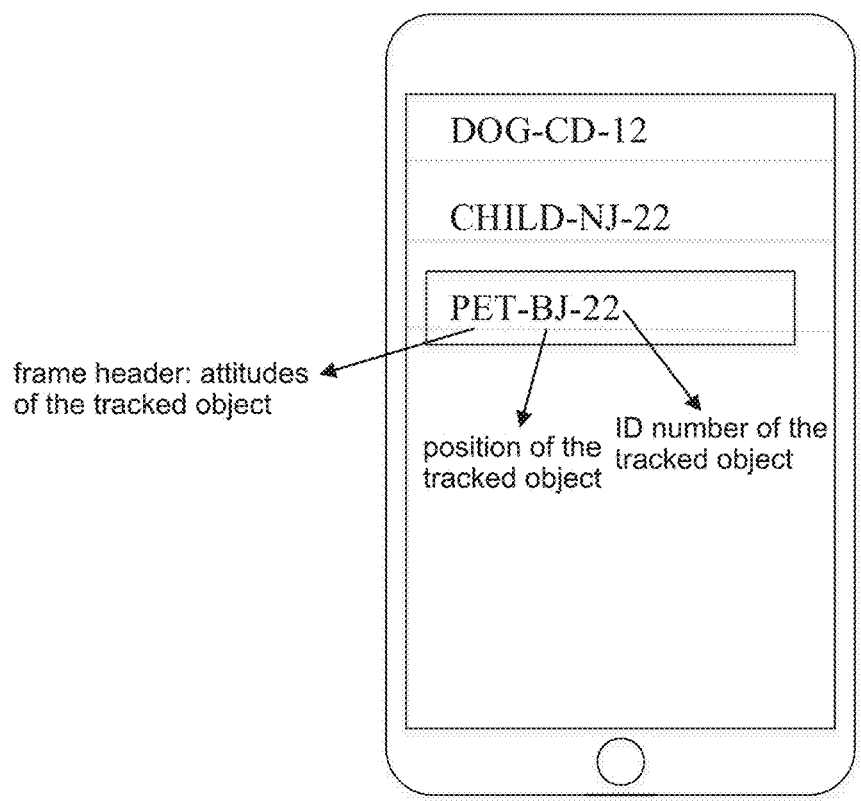
FIG. 3 is a sketch view of SSID information display on a mobile terminal according of the wireless tracking and positioning system and the method according to the embodiment 1 of the present invention.
Figure 4:
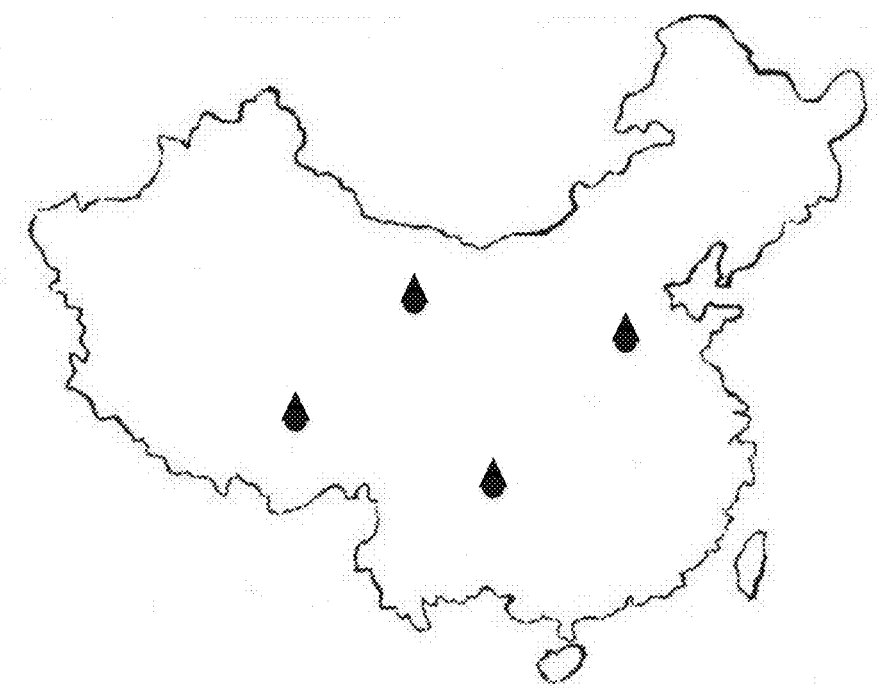
FIG. 4 is a sketch view of display on a server cloud platform display of the wireless tracking and positioning system and the method according to the embodiment 1 of the present invention.
Figure 5:
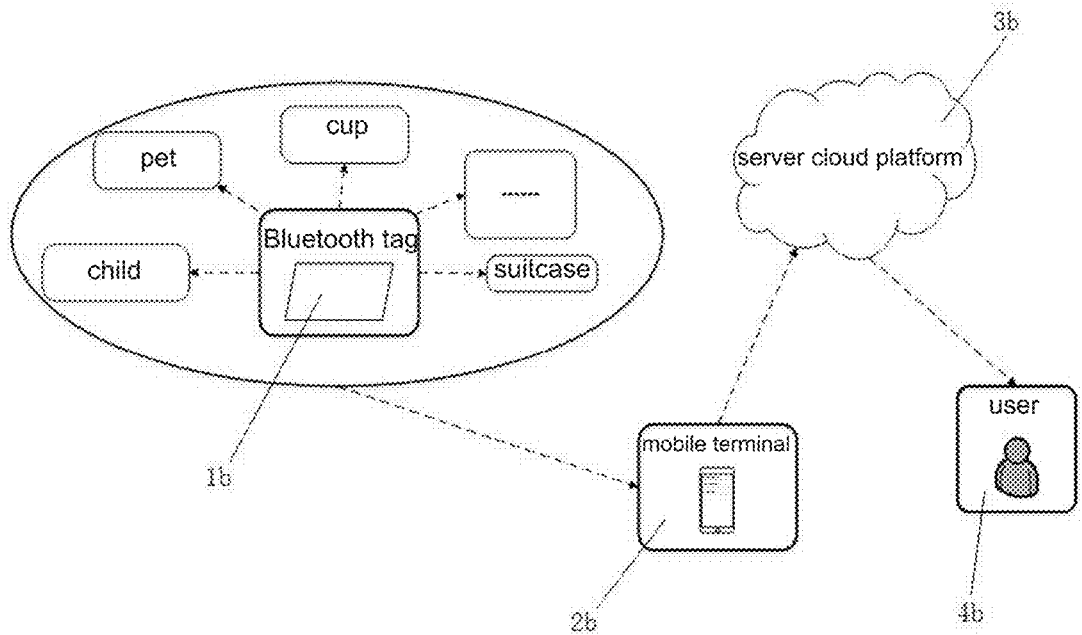
FIG. 5 is a structural view of a wireless tracking and positioning system according to an embodiment 2 of the present invention.

Referring to FIG. 2, a wireless tracking and positioning method based on the wireless tracking and positioning system is provided, comprising steps of:

placing a WIFI tag 1a (a WIFI transmitter) on a pet or a valuable item for continuously or intermittently broadcasting SSID information; receiving the ID information with a mobile terminal 2a nearby which then reads ID information of the WIFI tag 1a (SSID information with frame headers as shown in FIG. 3), and sends self position information to the WIFI tag 1a; meanwhile, real-time sending (through a WIFI network or a mobile network) the position information of a tracked object to a server cloud platform 3a by the mobile terminal 2a as a relay station; storing information of the tracked object in the server cloud platform 3a; when the pet or the valuable item moves, timely updating and storing the position information of the wireless tag 1a, and displaying the position information on the server cloud platform 3a; when a user 4a requires the position information of the pet or the valuable item, accessing the server cloud platform 3a through an interface reserved by the server cloud platform 3a in real time, and obtaining the position information and the SSID information of the tracked object.

Embodiment 2

Referring to FIGS. 5-8, a wireless tracking and positioning system according to an embodiment 2 of the present invention is provided, comprising: a Bluetooth tag (a Bluetooth transmitter) 1b, a mobile terminal 2b and a server cloud platform 3b, for a user 4b to receive position information of a tracked object.

The Bluetooth tag 1b continuously or intermittently broadcasts ID information to be received by the mobile terminal 2b nearby. The Bluetooth tag 1b can be worn on a pet or fixed on a valuable item and other objects that need to be tracked and positioned. The Bluetooth tag (the Bluetooth transmitter) adopts a highly integrated Bluetooth chip.

A first end of the mobile terminal 2b wirelessly detects the Bluetooth tag 1b, and a second end of the mobile terminal 2b is wirelessly connected to the server cloud platform 3b; the mobile terminal 2b receives the ID information of the Bluetooth tag 1b and reads position information and other important information from the ID information. The mobile terminal 2b directly displays the position information of the tracked object, and the position information of the tracked object is provided to the user by the mobile terminal 2b through, but not limited to, GPS positioning and cellular base station positioning. The mobile terminal 2b near the tracked object also serves as a relay station for sending the position information to the server cloud platform 3b for storage and update through a mobile network or a Bluetooth network, and the server cloud platform 3b provides the interface to the user 4b for accessing the server cloud platform 3b. The user 4b access the interface of the server cloud platform 3b to obtain the position information of the tracked object, so as to real-time track and position the position information and the ID information of the tracked object.

The mobile terminal 2b as a relay station near the tracked object is a mobile phone of a passerby, and is not arranged in advance. Meanwhile, the Bluetooth tag 1b real-time communicates with the mobile terminal 2b without handshake interaction and password verification of a wireless signal. The Bluetooth tag 1b continuously or intermittently broadcasts the ID information, and information of the Bluetooth tag 1b is easily received by the mobile terminal 2b nearby.

The server cloud platform 3b receives data information from the mobile terminal 2b, and provides an interface for the user 4b to communicate with the server cloud platform 3b, and for the user to access the server cloud platform 3b in real time, so as to track and position valuable items or pets.

Figure 6:
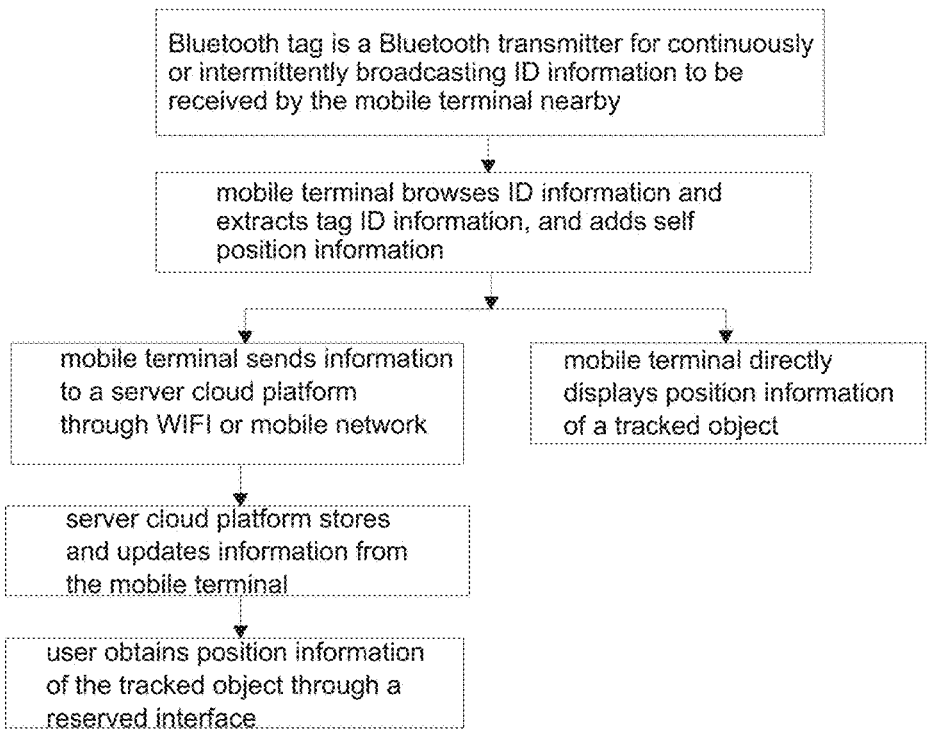
FIG. 6 is a flowchart of a wireless tracking and positioning method according to the embodiment 2 of the present invention.
Figure 7:
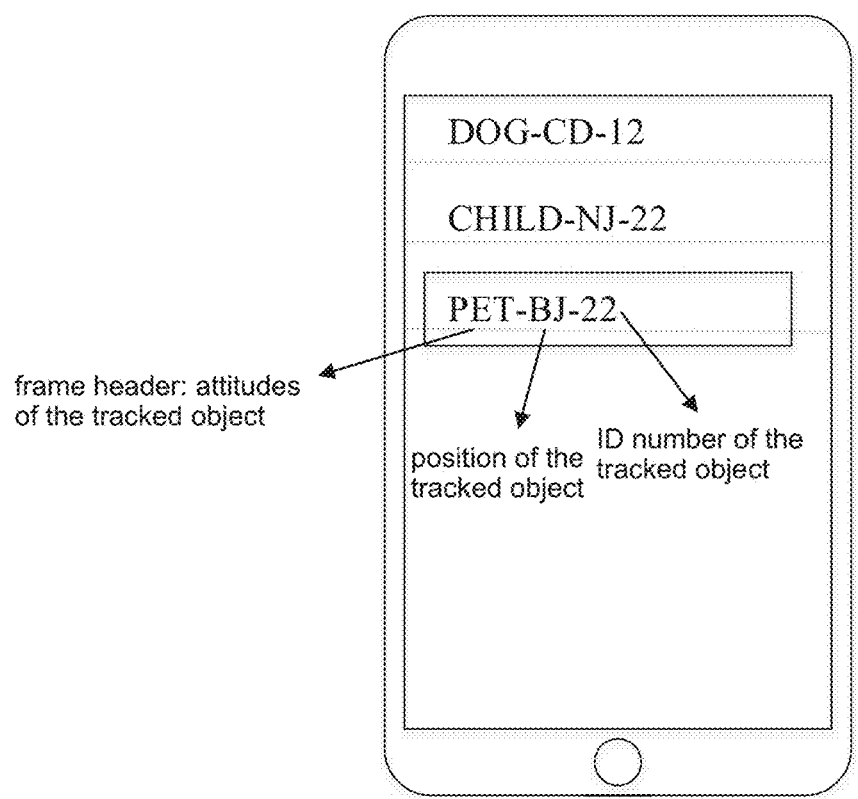
FIG. 7 is a sketch view of SSID information display on a mobile terminal according of the wireless tracking and positioning system and the method according to the embodiment 2 of the present invention.
Figure 8:
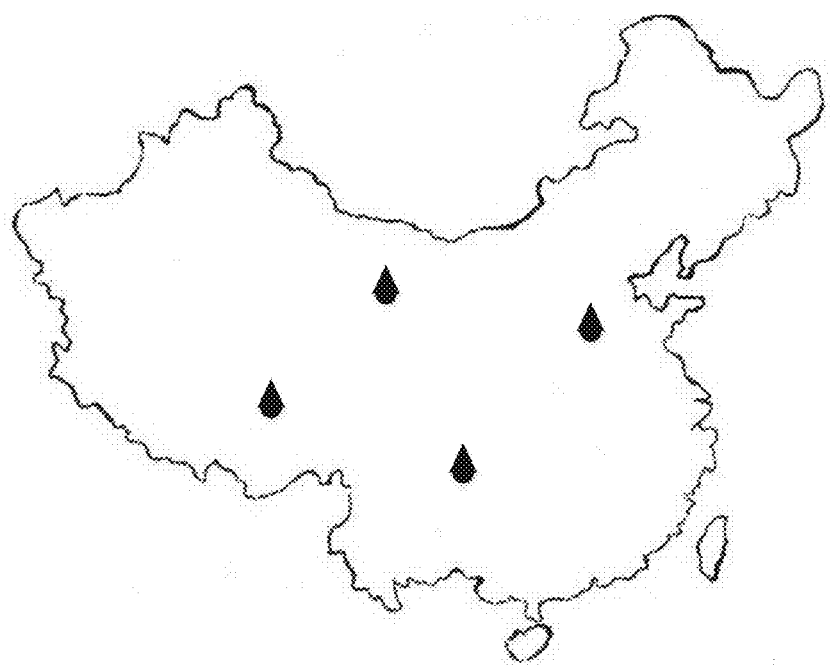
FIG. 8 is a sketch view of display on a server cloud platform display of the wireless tracking and positioning system and the method according to the embodiment 2 of the present invention.

Referring to FIG. 6, a wireless tracking and positioning method based on the wireless tracking and positioning system is provided, comprising steps of:

placing a Bluetooth tag 1b (a Bluetooth transmitter) on a pet or a valuable item for continuously or intermittently broadcasting ID information; receiving the ID information with a mobile terminal 2b nearby which then reads ID information of the Bluetooth tag 1b, and sends self position information to the Bluetooth tag 1b; meanwhile, real-time sending (through a Bluetooth network or a mobile network) the position information of a tracked object to a server cloud platform 3b by the mobile terminal 2b as a relay station; storing information of the tracked object in the server cloud platform 3b; when the pet or the valuable item moves, timely updating and storing the position information of the wireless tag 1b, and displaying the position information on the server cloud platform 3b; when a user 4b requires the position information of the pet or the valuable item, accessing the server cloud platform 3b through an interface reserved by the server cloud platform 3b in real time, and obtaining the position information and the ID information of the tracked object.

The wireless tracking and positioning system and method of the present invention is reasonable designed to facilitate an observer to obtain a position of a tracked object in time, and realize real-time tracking and positioning of information such as the position of the tracked object.

Accordingly, the wireless tag may comprise both the WIFI chip and the Bluetooth chip.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention to includes all modifications encompassed within the spirit and scope of the following claims.

What is claimed is:

1. A wireless tracking and positioning system, comprising: a wireless tag, a mobile terminal and a server cloud platform, for a user to receive position information of a tracked object;

wherein the wireless tag is a wireless transmitter, which is placed on the tracked object for continuously or intermittently broadcasting ID (identification) information to be received by the mobile terminal nearby;

wherein a first end of the mobile terminal wirelessly detects the wireless tag, and a second end of the mobile terminal is wirelessly connected to the server cloud platform; the mobile terminal receives the ID information of the wireless tag and reads verification information from the ID information;

wherein the server cloud platform receives data information from the mobile terminal, and provides an interface for the user to communicate with the server cloud platform, and for the user to access the server cloud platform in real time, so as to track and position the tracked object;

wherein the mobile terminal directly displays the position information of the tracked object, and the position information of the tracked object is provided to the user by the mobile terminal; the mobile terminal near the tracked object also serves as a relay station for sending the position information to the server cloud platform for storage and update through a mobile network or a wireless network, and the server cloud platform provides the interface to the user for accessing the server cloud platform; the user access the interface of the server cloud platform to obtain the position information of the tracked object, so as to real-time track and position the position information and the ID information of the tracked object.

2. The wireless tracking and positioning system, as recited in claim 1, wherein the server cloud platform comprises a php (personal home page) file and an HTML (HyperText Markup Language) file; the php file is used to store the ID information and the position information of the tracked object received from the mobile terminal, and to update data in real time; the HTML file provides a real-time browsing information platform to the user.

3. The wireless tracking and positioning system, as recited in claim 2, wherein the mobile terminal near the tracked object is a mobile phone of a passerby, and is not arranged in advance.

4. The wireless tracking and positioning system, as recited in claim 3, wherein the wireless tag communicates with the mobile terminal without password verification of a wireless signal.

5. The wireless tracking and positioning system, as recited in claim 4, wherein the wireless tag is a highly integrated WIFI chip or a Bluetooth chip, or comprises both the WIFI chip and the Bluetooth chip.

6. A wireless tracking and positioning method of a wireless tracking and positioning system, comprising steps of: placing a wireless tag on a tracked object, wherein the wireless tag is a wireless transmitter, which is placed on the tracked object for continuously or intermittently broadcasting ID (identification) information; receiving the ID information with a mobile terminal which then sends self position information and the ID information of the wireless tag to a server cloud platform; storing information of the tracked object in the server cloud platform; when the tracked object moves, timely updating and storing the position information of the wireless tag, and displaying the position information on the server cloud platform; when a user requires the position information of the tracked object, accessing the server cloud platform through an interface reserved by the server cloud platform in real time, and obtaining the position information and the ID information of the tracked object;

wherein the mobile terminal directly displays the position information of the tracked object, and the position information of the tracked object is provided to the user by the mobile terminal; the mobile terminal near the tracked object also serves as a relay station for sending the position information to the server cloud platform for storage and update through a mobile network or a wireless network, and the server cloud platform provides the interface to the user for accessing the server cloud platform; the user access the interface of the server cloud platform to obtain the position information of the tracked object, so as to real-time track and position the position information and the ID information of the tracked object.

7. The wireless tracking and positioning method, as recited in claim 6, wherein the server cloud platform comprises a php (personal home page) file and an HTML (HyperText Markup Language) file; the php file is used to store the ID information and the position information of the tracked object received from the mobile terminal, and to update data in real time; the HTML file provides a real-time browsing information platform to the user.

8. The wireless tracking and positioning method, as recited in claim 7, wherein the mobile terminal near the tracked object is a mobile phone of a passerby, and is not arranged in advance;

wherein the wireless tag communicates with the mobile terminal without password verification of a wireless signal;

wherein the wireless tag is a highly integrated WIFI chip or a Bluetooth chip, or comprises both the WIFI chip and the Bluetooth chip.

* * * * *